United States Patent [19]

Enkhaus et al.

[11] 4,064,542
[45] Dec. 20, 1977

[54] APPARATUS FOR MOUNTING A CATHODE RAY TUBE

[75] Inventors: Roland Roger Enkhaus; John Paul Evert, both of St. Paul, Minn.

[73] Assignee: Sperry Rand Corporation, New York, N.Y.

[21] Appl. No.: 712,433

[22] Filed: Aug. 6, 1976

[51] Int. Cl.² .......................................... H04N 5/645
[52] U.S. Cl. ..................................... 358/245; 358/248
[58] Field of Search ............... 358/248, 249, 245, 246, 358/247; 312/7, 4; 313/50, 482

[56] References Cited

U.S. PATENT DOCUMENTS

| 2,484,345 | 10/1949 | Hinz | 358/248 |
| 2,497,078 | 2/1950 | Gall | 358/248 |
| 2,643,373 | 6/1953 | Morris | 358/248 |
| 2,669,708 | 2/1954 | DuMont | 358/247 |
| 3,013,117 | 12/1961 | Nichol | 358/245 |

FOREIGN PATENT DOCUMENTS

| 1,135,321 | 6/1955 | France | 358/248 |
| 1,143,228 | 3/1960 | Germany | 358/248 |
| 506,418 | 8/1936 | United Kingdom | 358/248 |

Primary Examiner—Robert L. Griffin
Assistant Examiner—Edward L. Coles
Attorney, Agent, or Firm—William D. Bauer; Kenneth T. Grace; Marshall M. Truex

[57] ABSTRACT

This invention relates to an apparatus for shock mounting in a frame a cathode ray tube of the type having a rear neck portion containing an electron gun integrally formed with a frustum which terminates in a planar or spherical surface on which information is displayed. Compared to the frustum portion, a relatively narrow first annular member constructed of a substantially rigid material is positioned along the cathode ray tube near the convergence of the frustum portion with the neck. This first ring is affixed solidly to the cathode ray tube and has an outer surface which is formed by two surfaces which form an angle with the cathode ray tube's major axis. As such, a surface is provided for opposing a force directed substantially parallel to major axis. A second annular member, also constructed of a substantially rigid material, is positioned circumjacent to the first member, has an inner surface substantially complementary to the outer surface of the first member, and has its outer surface connected to the frame. A third annular member consisting of a resilient material is interposed between the first and second annular members.

8 Claims, 2 Drawing Figures

APPARATUS FOR MOUNTING A CATHODE RAY TUBE

BACKGROUND OF THE INVENTION

Means to support relatively delicate cathode ray tubes and to prevent their breakage upon shock impact have been much sought in the past. Some prior art devices for shock supporting cathode ray tubes such as shown in U.S. Pat. No. 2,114,612 provide support along the entire length of the cathode ray tube or at least along the entire length of the relatively narrow neck portion of the tube. Such devices suffer the disadvantage of being relatively expensive to fabricate and make it difficult to service the cathode ray tube assembly, since a substantial portion of the tube itself is enveloped within the mounting means. These mounting means also suffer from another disadvantage in that any flexing, whatsoever, in the supporting means itself creates a force on the neck of the cathode ray tube and may cause breakage, especially at the point where the neck of the cathode ray tube meets the flaired or frustum portion.

Other prior art approaches which are less enveloping normally do not provide adequate shock protection in all three axes of the cathode ray tube. That is, prior art tube supporting devices not constructed in the enveloping manner may provide shock support for forces substantially orthogonal to the cathode ray tube's major axis but are generally insufficient in providing shock support for forces which are substantially parallel to the cathode ray tube's major axis and especially to forces striking the cathode ray tube substantially parallel to its major axis from the rear or neck end of the cathode ray tube. Typical of these devices are U.S. Pat. No. 2,484,345 and U.S. Pat. No. 2,428,928.

SUMMARY OF THE INVENTION

The present invention overcomes these disadvantages by providing a shock absorbing support means which is relatively less expensive to fabricate, provides much better serviceability and provides shock support in all three axes.

The present invention provides an apparatus for mounting a cathode ray tube in a frame, said tube having a rear neck portion integrally formed with a frustum. It includes a first annular member constructed of a substantially rigid material, positioned along the cathode ray tube near the convergence of the frustum portion and the neck. This first annular member is affixed solidly to the cathode ray tube and has an outer surface which defines two surfaces which form an angle with the cathode ray tube's major axis, such that a surface for opposing a force substantially parallel to the major axis is provided. A second annular member, also constructed of a substantially rigid material, is positioned circumjacent to the first annular member and has an inner surface substantially complementary in shape to the outer surface of the first annular member. The outer surface of this second annular member contacts the frame. A resilient material is interposed between the first annular member and the second annular member such that forces transmitted to the frame are at least partially absorbed in the resilient material and are only transmitted to the cathode ray tube in substantially diminished intensities.

OBJECTS

It is an object of the present invention to provide a means for shock mounting a cathode ray tube.

It is another object of the present invention to provide a mount for a cathode ray tube which is relatively inexpensive to fabricate.

It is a further object of the present invention to provide a mount for a cathode ray tube which allows much easier maintainability to the cathode ray tube assembly.

It is a still further object of the present invention to provide a shock mount for a cathode ray tube which provides adequate constraint in all three axes.

It is a still further object of the present invention to provide a shock mounting apparatus for a cathode ray tube which will prevent breakage fo the cathode ray tube when externally subjected to mechanical shock.

BRIEF DESCRIPTION OF THE DRAWINGS

The foregoing objects, advantages, construction and operation of the present invention will become more readily apparent from the following description of the accompanying drawings in which.

DESCRIPTION OF THE PREFERRED EMBODIMENT

Figure 1:
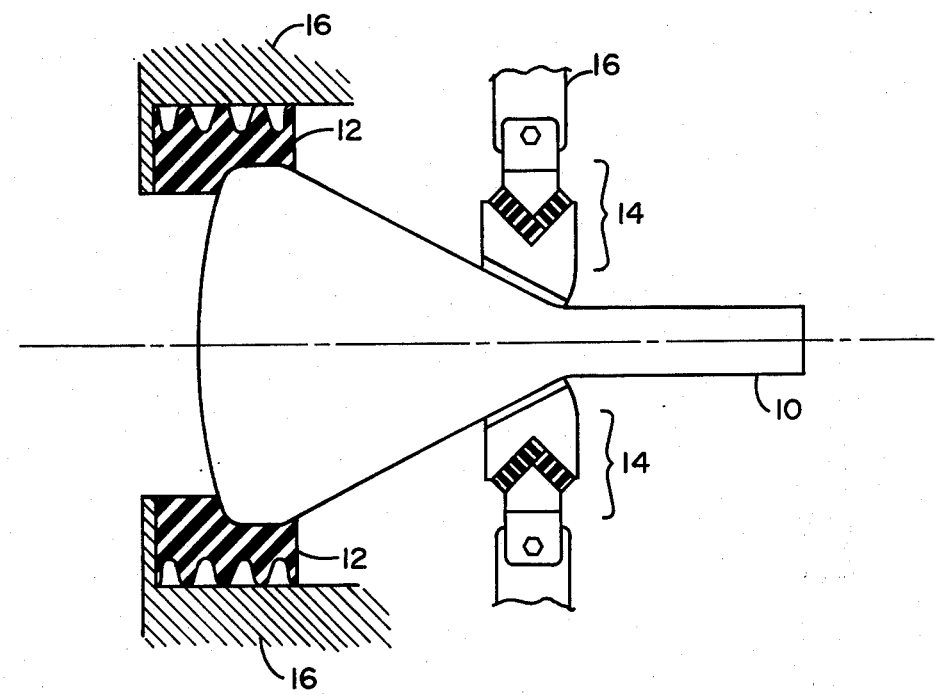
FIG. 1 is a cross-sectional view of the overall cathode ray tube support apparatus.

Although many different shapes and sizes of cathode ray tubes exist in the market today, the vast majority consist of generally the same primary relative configuration, although individual sizes and detail shapes may vary. A cross-sectional shape of a typical cathode ray tube is illustrated in FIG. 1 by reference numeral 10. This cross-sectional view taken along the tube's major axis shows a relatively narrow neck locatd at the rear of the cathode ray tube, the neck being integrally formed with a frustum portion which flairs outwardly and terminates in a relatively flat front face to define an evacuable chamber. This is the basic cross-sectional cathode ray tube shape with which the shock mounting apparatus of the present invention may be utilized. Such a cathode ray tube may have either a circular face, rectangulr face or other desired shape. The exact shape of the face and exact cross-sectional shape of the flaired portion and neck are immaterial to the functional operation of the present invention.

The cathode ray tube 10, in FIG. 1, is shown being supported by two annular members 12 and 14. These support members, both containing resilient materials, comprise the entire positioning and shock-absorbing means for the cathode ray tube. All other pices of apparatus commonly used with such a cathode ray tube, except for the deflection yoke, are suspended from the frame and are not attached directly to the cathode ray tube 10. In this manner, the shock-absorbing means does not have to contend with the mass of the additional apparatus, and, hence, the inertia of the cathode ray tube is kept to the minimum. The deflection yoke (not illustrated) is attached directly to the inner portion 18 of support ring 14 thereby maintaining the critical positioning between the deflection yoke and the neck of the cathode ray tube but still providing a stronger shock support surface than would have been available if the deflection yoke had been mounted directly to the relatively fragile neck.

It is significant that no support means are provided directly on the neck of the cathode ray tube 10. Since the neck of the cathode ray tube 10 is relatively long and has a relatively small mass providing a support means along the neck or at the rear end of the neck as in the prior art tends to exert unnecessary forces upon the cathode ray tube due to the inherent resiliency of the supporting means itself. Since the mass of the neck is relatively small, the "g" forces developed upon the acceleration and deceleration due to shock forces upon the neck are minimal.

The front support means 12 consists of a first resilient annular ring enveloping the periphery of the face of the cathode ray tube and extending around the front edge of the cathode ray tube 10 a short distance. This resilient ring 12 which is supporting the cathode ray tube 10 has an outer surface which is supported directly by the rigid frame 16. The inner surface of the resilient ring 12 contains a concave portion which is adapted to accept the front periphery of the cathode ray tube 10, such that a portion of the outer surface of the face of the cathode ray tube can be supported with a resilient material as is a portion of the sidewall of the frustum portion of the cathode ray tube 10. This resilient ring 12 will thereby absorb shock from five of the six possible directions and even absorb shock in the sixth direction due to frictional forces acting between the resilient ring 12 and the edge of the cathode ray tube 10. Because the front support means 12 contacts the sidewall of the frustum portion of the cathode ray tube 10, a force substantially orthogonal to the major axis of the cathode ray tube 10 will find absorption in the resilient ring 12. Since the resilient ring 12 also supports a portion of the front face of the cathode ray tube 10, a force upon the cathode ray tube 10 from a direction substantially parallel with the major axis of the cathode ray tube and from the rear will also be absorbed in the resilient ring 12.

A second support ring 14 is located along the cathode ray tube 10 at approximately the point of convergence of the frustum portion and neck portions of the cathode ray tube 10. The exact position of the support ring 14 shown in FIG. 1 is on the frustum portion of the cathode ray tube 10 just slightly forward of the neck of the cathode ray tube 10. This position, although not critical, is chosen in FIG. 1 because the frustum portion of the cathode ray tube is inherently stronger than the neck portion and also to properly position the yoke. This support ring 14, as will be shown below, provides support for the cathode ray tube along all three axes and in all six possible shock directions.

Figure 2:
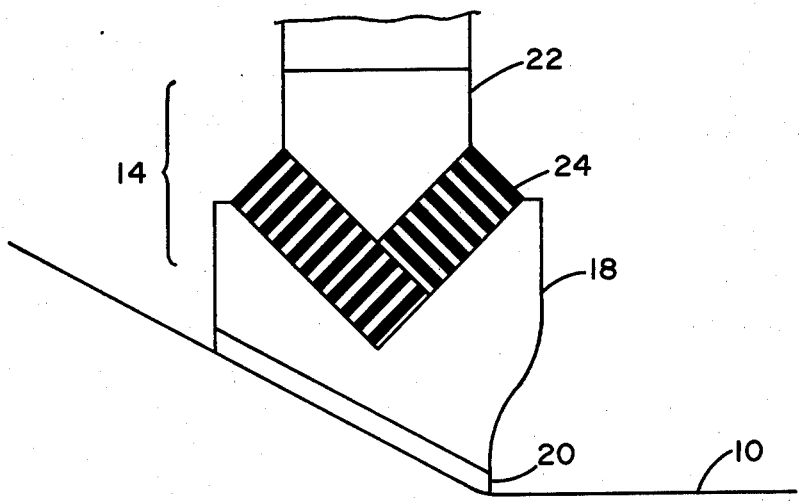
FIG. 2 is an expanded cross-sectional view of one of the support rings.

An enlarged cross-sectional view of the support ring 14 is shown in FIG. 2. The support ring 14 consists of a first rigid annular member 18 which is affixed directly to the cathode ray tube preferably with a suitable adhesive 20. This annular ring 18 is shown in FIG. 2 as having an outer surface with a concave V-shape formed in it. The characteristics of this V-shape surface, although not its exact shape, is important as will be discussed later. A second annular member 22, also constructed of a suitable rigid material such as a hard plastic or aluminum, is positioned circumjacent to the first annular ring 18. The inner surface of the second ring 22 is a convex V-shaped surface, approximately complementary to the outside surface of annular ring 18. Contained within the space between the annular rings 18 and 22 is a resilient material 24, such as rubber, for providing shock absorbing characteristics. The outer surface of annular ring 22 is connected directly to the frame 16 which encloses the entire cathode ray tube 10 and associated electronic circuitry.

Thus, the support ring 14 is comprised of two circumjacent annular rings 18 and 22 having interior complementary surfaces and an interposed resilient material 24. The arrangement and combination of these rigid and resilient materials provide a shock-absorbent characteristic much different from that which would be obtained by merely using one or the other of the materials or in the use of both materials in a substantially different configuration. Since the two rigid rings 18 and 22 are circumjacent with respect to each other and contain a resilient material 24 between them, forces acting substantially orthogonal to the major axis of the cathode ray tube 10 are absorbed. In addition, the V-shape cross section of the complementary surfaces of the annular rings 18 and 22 provides support for those forces directed substantially parallel to the major axis of cathode ray tube, either from the front or from the rear. Thus, in this one support ring 14 shock-absorbent support for all three axes in all six directions is provided.

The exact shape of the complementary surfaces of annular rings 18 and 22 is not important. The rings are shown in FIG. 2 with the inner ring 18 having a concave V-shape. However, it is to be noted that a similar result will occur should the inner ring 18 have a convex V-shape and the outer ring 22 a complementary concave V-shape. Further, a V-shape is not necessary to the proper operation of the present invention. That is, a U-shape or, indeed, any other shape providing two surfaces which form an angle with the major axis of the cathode ray tube 10 such that a surface is provided which will provide resilient material compression upon the application of a force substantially parallel to the cathode ray tube's major axis is all that is necessary. In practicing the present invention, one may find it convenient to alter the exact shape of the complementary surfaces of the annular rings 18 and 22.

The annular ring 18 may be constructed of any suitable rigid material such that the forces present upon the outer surface of the annular ring 18 are transmitted to the cathode ray tube 10 in substantially the same directions and intensities as they are incident upon that outer surface. Since this annular ring 18 becomes part of the mass whose shock must be absorbed, it is desirable that this ring be constructed of as light a material as possible. Two examples of suitable material for this annular ring 18 are hard plastic or aluminum.

Thus, it can be seen that there has been shown and described a novel apparatus for shock mounting a cathode ray tube. It is to be understood, however, that various changes, modifications and substitutions in the form of the details of the described apparatus an be made by those skilled in the art without departing from the scope of the invention as defined by the following claims.

What is claimed is:

1. An apparatus for mounting a cathode ray tube, having a rear neck portion integrally formed with a frustum, in a frame, comprising:
    a. a first annular member constructed of a substantially rigid material, positioned along said cathode ray tube near the convergence of said frustum portion and said neck of said cathode ray tube, affixed solidly to said cathode ray tube and having an outer surface which contains two surfaces which form an angle with the major axis of said cathode ray tube such that a surface for opposing a force substantially parallel to said major axis is provided;

b. a second annular member constructed of a substantially rigid material positioned circumjacent to said first annular member having an inner surface substantially complementary to said outer surface of said first annular member and whose outer surface is affixed to said frame; and c. a resilient material interposed between said first annular member and said second annular member.

2. An apparatus as in claim 1 wherein the first annular member is positioned along said frustum portion of said cathode ray tube just forward of said neck of said cathode ray tube.

3. An apparatus as in claim 1 wherein the first annular member is affixed to the cathode ray tube with an adhesive.

4. An apparatus as in claim 1 wherein the frustum portion of the cathode ray tube is conical.

5. An apparatus as in claim 1 wherein the outer surface of the first annular member comprises a V-shape groove defining surfaces substantially orthogonal to said major axis of said cathode ray tube.

6. An apparatus as in claim 5 wherein the outer surface of the first annular member is concave.

7. An apparatus for mounting a cathode ray tube in a frame, said tube having a rear neck portion integrally formed with a frustum having a face at the front thereof substantially orthogonal to the tube's major axis, comprising:

a. a first annular member constructed from a resilient material, positioned at the periphery of said face of said cathode ray tube and contacting said frame;

b. a second annular member constructed of a substantially rigid material, affixed to said frustum portion of said cathode ray tube immediately forward of said neck portion and having an outer surface which contains two surfaces which form an angle with said cathode ray tube's major axis;

c. a third annular member constructed of a substantially rigid material positioned circumjacent to said second annular member having an inner surface substantially complementary to said outer surface of said second annular member and whose outer surface is connected to said frame; and d. a resilient material interposed between said second annular member and said third annular member.

8. An apparatus as in claim 7 wherein the first annular member includes a concave inner surface allowing said first annular member to receive said cathode ray tube by contacting said cathode ray tube around the periphery of the base of said frustum such that said cathode ray tube is substantially supported along five of the six possible force directions.

* * * * *